United States Patent
Ou et al.

(10) Patent No.: US 8,029,309 B2
(45) Date of Patent: Oct. 4, 2011

(54) ELECTRONIC DEVICES WITH SLIDING AND TILTING MECHANISMS, AND ASSOCIATED METHODS

(75) Inventors: Chung-Yuan Ou, Taoyuan (TW);
Ching-Shih Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 247 days.

(21) Appl. No.: 11/542,704

(22) Filed: Oct. 3, 2006

(65) Prior Publication Data

US 2008/0081505 A1    Apr. 3, 2008

(51) Int. Cl.
*H01R 13/64* (2006.01)
(52) U.S. Cl. .................... 439/374; 455/550.1
(58) Field of Classification Search .......... 439/165, 439/374; 16/348, 357; 455/90, 550, 550.1; 379/433.12, 433.13
See application file for complete search history.

(56) References Cited

U.S. PATENT DOCUMENTS

| 5,548,478 A | 8/1996 | Kumar et al. |
| 2005/0044665 A1 | 3/2005 | Kuramochi |
| 2006/0073859 A1 | 4/2006 | Chou |

FOREIGN PATENT DOCUMENTS

| EP | 1312999 | 5/2003 |
| EP | 1422911 | 5/2004 |
| EP | 1439685 | 7/2004 |
| JP | 2006-005564 | 6/2004 |
| TW | I274984 | 9/1994 |
| TW | I255631 | 5/2006 |
| TW | I278216 | 4/2007 |
| WO | WO-2004057843 A1 | 7/2004 |

OTHER PUBLICATIONS

Japanese Office Action for Application No. 2006-293042; Applicant: HTC Corporation; Date of Mailing: Sep. 1, 2009 (5 pages).
Taiwanese Office Action for Application No. 095137798; Applicant: HTC Corporation; Date of Mailing: Mar. 25, 1999 (4 pages).
European Search Report, European Patent Office, European Application No. 06022320.3, Apr. 16, 2007, 9 pages.

*Primary Examiner* — Khiem Nguyen
(74) *Attorney, Agent, or Firm* — Perkins Coie LLP

(57) ABSTRACT

Electronic devices with sliding and tilting mechanisms are disclosed. The electronic device can include a first electronic component having a handheld display, a second electronic component having a handheld keyboard, and a coupling slidably and pivotably connecting the first and second electronic components. Accordingly, the first and second electronic components can both slide and pivot relative to each other.

29 Claims, 11 Drawing Sheets

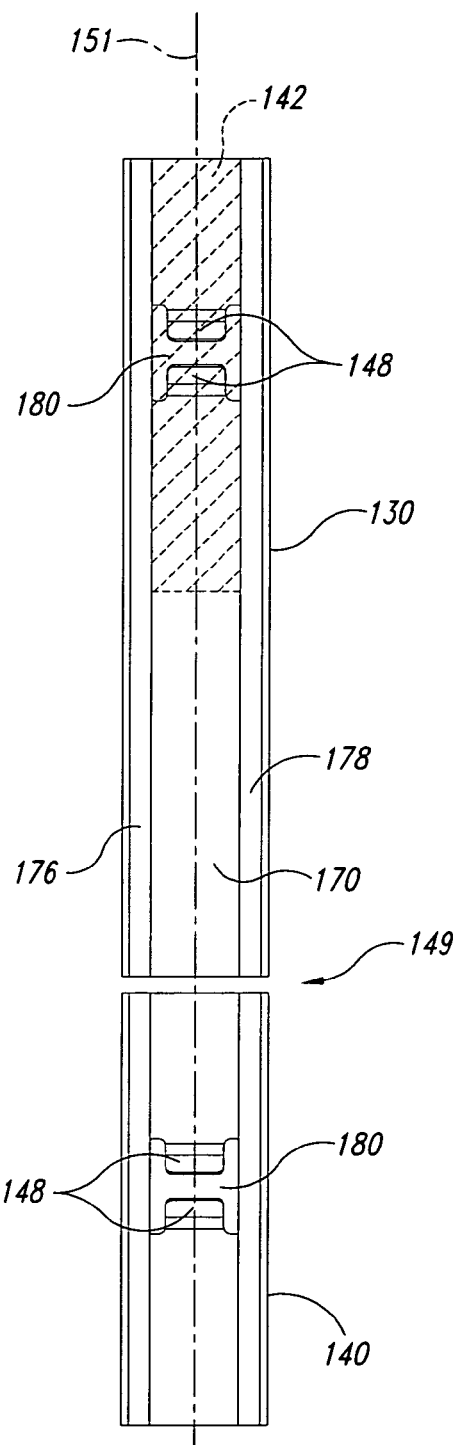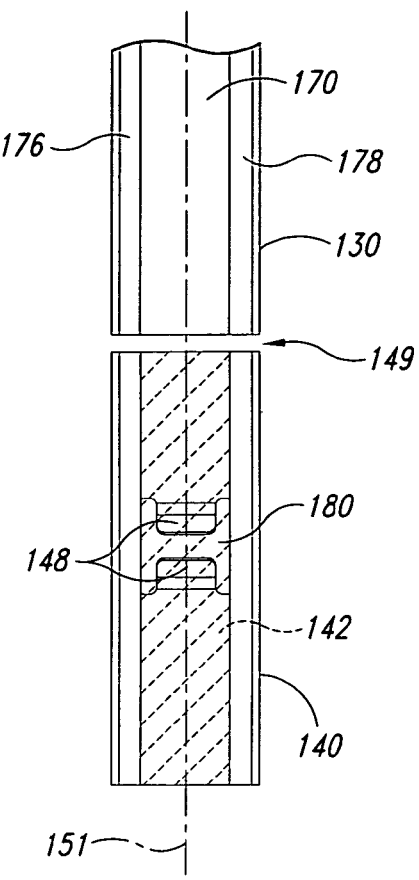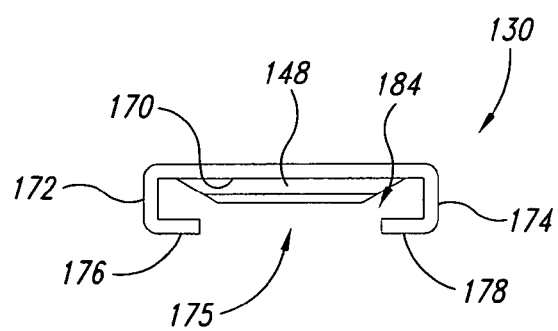
Fig. 5A
Fig. 5B
Fig. 5C

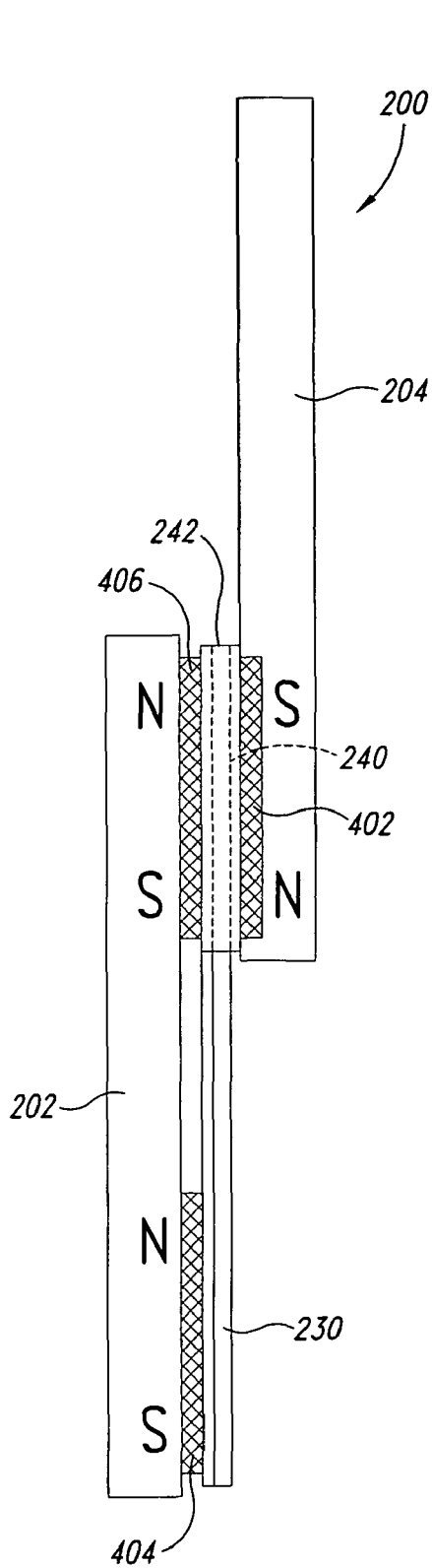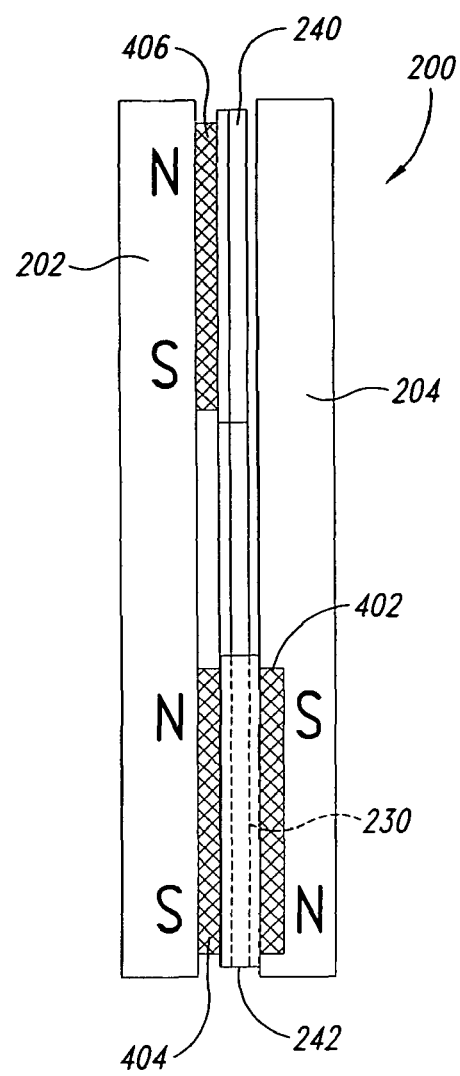
Fig. 12D
Fig. 12C

ELECTRONIC DEVICES WITH SLIDING AND TILTING MECHANISMS, AND ASSOCIATED METHODS

TECHNICAL FIELD

The present disclosure relates to electronic devices having slide and tilt mechanisms. In particular, aspects of the present disclosure relate to mobile communication and/or computing devices having slide and tilt mechanisms.

BACKGROUND

Current mobile communication/computing devices typically include a display and a keyboard that can either pivot or slide relative to each other. For example, the display can pivot relative to the keyboard in a flip phone, or can slide relative to the keyboard in a personal digital assistant (PDA) or a smart phone. FIG. 1 illustrates a representative mobile communication/computing device 10 that includes a display 12 carrying a screen 18. The display 12 is attached to a base 14 that carries a keyboard 16. The display 12 can slide relative to the base 14 to expose the keyboard 16.

Current mobile communication/computing devices have several drawbacks. For example, one drawback associated with the mobile communication/computing device 10 is that the viewing angle of the screen 18 cannot be adjusted with respect to the keyboard 16. As a result, the user has to look up to read the screen 18 and look down to see the keyboard 16. Such repetitive motion can put a strain on the user's neck and discourage the user from using the mobile device 10. Accordingly, there is a need for a mobile communication/computing device that allows the user to adjust the viewing angle of the screen relative to the keyboard while providing for an overall compact arrangement.

BRIEF DESCRIPTION OF THE DRAWINGS

FIGS. 5A-5B are bottom views of the sliding members of the electronic device of FIGS. 2A-2C in a first position and a second position, respectively, and configured in accordance with an embodiment of the invention.

FIG. 5C is an end view of the sliding members of FIGS. 5A-5B configured in accordance with an embodiment of the invention.

FIGS. 12C-12D are schematic cross-sectional views of the electronic device of FIGS. 12A-12B configured in accordance with an embodiment of the invention.

DETAILED DESCRIPTION

A. Overview

Figure 1:
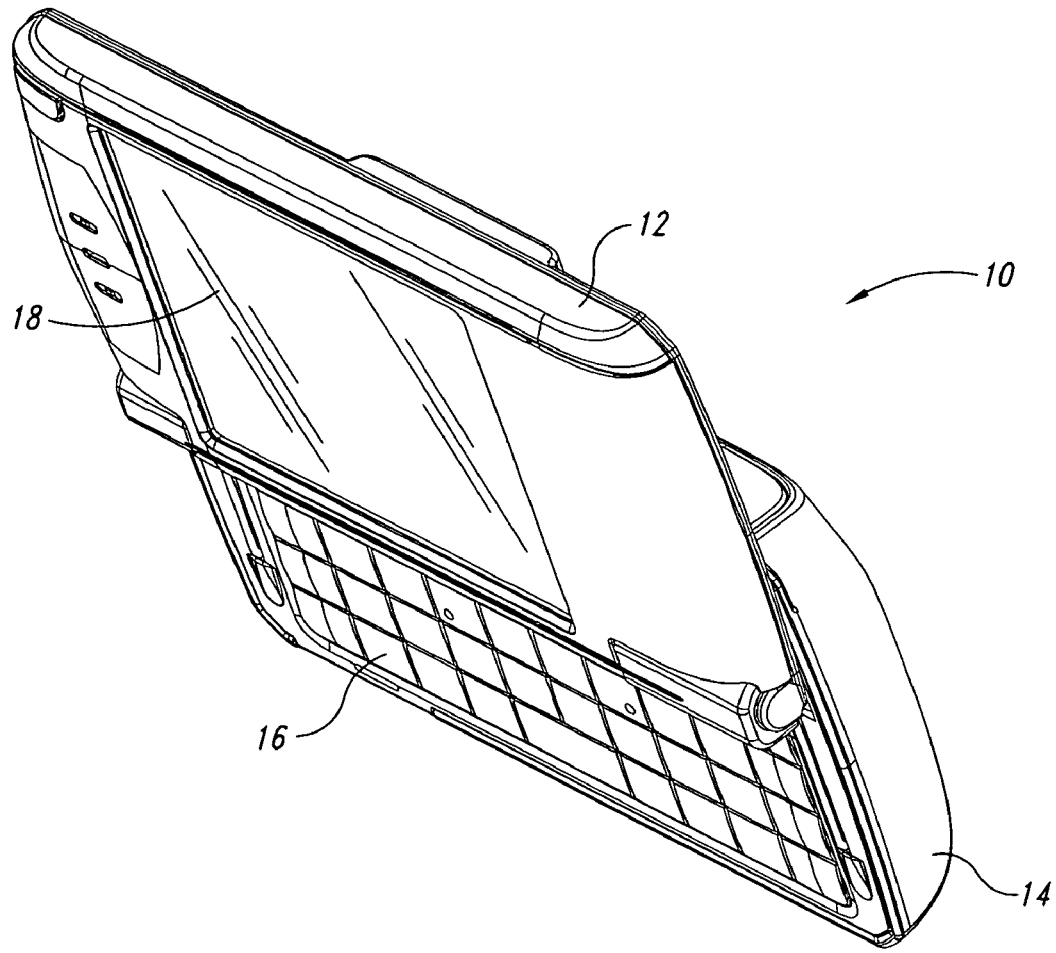
FIG. 1 is a perspective view of a mobile communication/computing device configured in accordance with the prior art.

The present disclosure describes sliding and tilting mechanisms for electronic devices, and associated methods. It will be appreciated that several of the details set forth below are provided to describe the following embodiments in a manner sufficient to enable a person skilled in the relevant art to make and use the disclosed embodiments. Several of the details and advantages described below, however, may not be necessary to practice certain embodiments of the invention. Additionally, the invention can include other embodiments that are within the scope of the claims but are not described in detail with respect to FIGS. 2-12.

One aspect of certain of the disclosed embodiments is directed toward a mobile communication device having a sliding and tilting mechanism. The mobile communication device can include a first electronic component (e.g., a display) having a first sliding member, a second electronic component (e.g., a keyboard) having a guide member, and a hinge coupling the first and second electronic components. The hinge can carry a second sliding member. The first and second sliding members are positioned to engage with the guide member, with at least one of the first and second electronic components slidable relative to each other when the first and second sliding members are axially aligned with each other. At least one of the first and second electronic components is pivotable relative to the other when the guide member is engaged with the second sliding member.

In another embodiment, the first and second sliding members can form a discontinuous path, and at least one of the guide member and the discontinuous path is slidable relative to the other when the first and second electronic components are in a first configuration (e.g., in a slide-out configuration). The guide member is at least restricted from sliding relative to the first and second sliding members when the first and second electronic components are in a second configuration (e.g., in a tilted configuration).

In another embodiment, the mobile communication device can include sliding means (e.g., rails) for sliding the first electronic component along a sliding path relative to the second electronic component. The sliding means can include a first sliding member and a second sliding member positioned to engage with a guide member when the first and second sliding members are axially aligned with each other. The mobile communication device can also include pivoting means (e.g., hinges) for pivoting the first electronic component relative to the second electronic component when the first electronic component is restricted from sliding relative to the second electronic component. The mobile communication device can further include restricting means for at least restricting the first electronic component from sliding relative to the second electronic component when the first electronic component is in a position relative to the second electronic component along the sliding path.

Another aspect of the disclosed embodiments is directed toward a sliding and tilting module for an electronic device including a first electronic component and a second electronic component. The module can include a first sliding member carried by the first electronic component, a guide member carried by the second electronic component, and a hinge coupling the first and second electronic components and carrying a second sliding member. The first and second sliding members are axially aligned with each other and positioned to engage the guide member when at least one of the first and second electronic components is slidable relative to the other. The guide member is engaged with the second sliding member when at least one of the first and second electronic components is pivotable relative to the other.

Yet another aspect of the disclosed embodiments is directed toward a handheld e-mail device that can include a first electronic component having a first front surface, a rear surface opposite to the front surface, a display disposed on the front surface, and a first sliding member disposed on the rear surface. The handheld e-mail device can also include a second electronic component having a second front surface, a keyboard and a guide member, and the keyboard and the guide member are disposed on the second front surface. The handheld e-mail device can further include a hinge coupled between the rear surface of the first electronic component and the second front surface of the second electronic component and carrying a second sliding member. The first and second sliding members are positioned to engage the guide member with at least one of the first and second electronic components slidable relative to the other when the first and second sliding members are axially aligned with each other. At least one of the first and second electronic components is pivotable relative to the other when the guide member is engaged with the second sliding member.

Further aspects are directed to methods for operating an electronic device including a first electronic component and a second electronic component. For example, one method can include sliding the first electronic component along a sliding path relative to the second electronic component. The method can also include restricting the first electronic component from sliding relative to the second electronic component when the first electronic component is in a first position relative to the second electronic component along the sliding path. The method can still further include pivoting the first electronic component relative to the second electronic component when the first electronic component is restricted from sliding relative to the second electronic component.

B. Electronic Devices with Sliding and Tilting Mechanisms

Figure 2A:
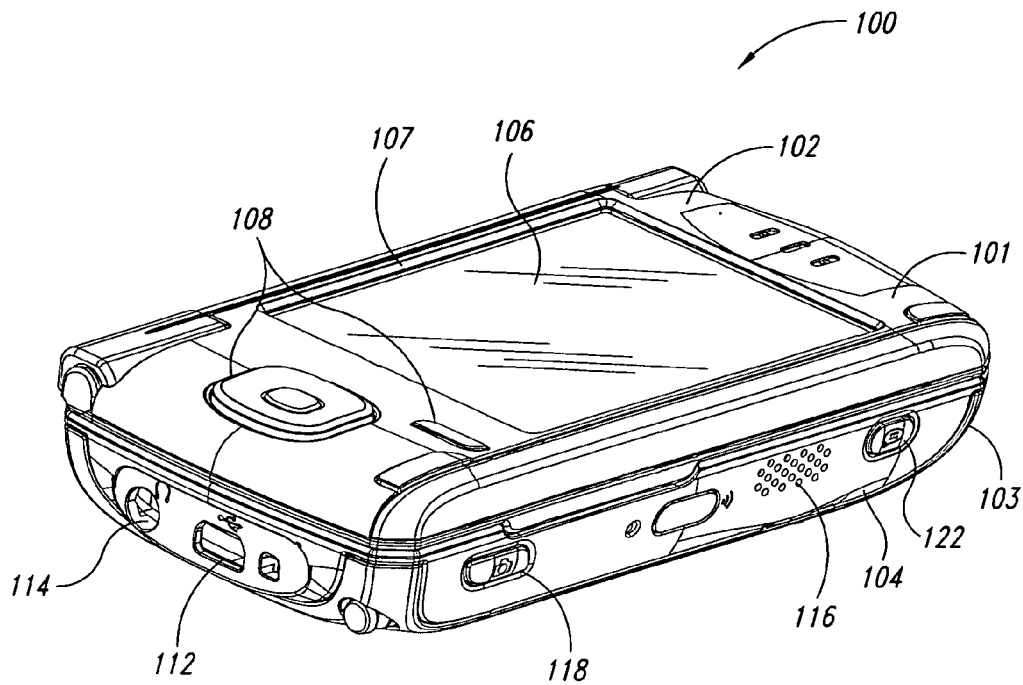
FIGS. 2A-2C are perspective views of an electronic device in a closed configuration, a slide-out configuration, and a tilted configuration, respectively, configured in accordance with an embodiment of the invention.

FIG. 2A is a perspective view of an electronic device 100 in a closed configuration and configured in accordance with an embodiment of the invention. The electronic device 100 can include a first electronic component 102 and a second electronic component 104 movably engaged with the first electronic component 102. The first and second electronic components 102, 104 can slide and tilt relative to each other to provide a desired viewing angle to a user. In the illustrated position, the second electronic component 104 is generally juxtaposed face-to-face with the first electronic component 102. In other positions, such as those shown in FIGS. 2B-2D, the first and second electronic components 102, 104 can be offset from each other, and/or tilted relative to each other.

The first electronic component 102 can include a first housing 101 and various electronic and/or mechanical components carried by or attached to the first housing 101. For example, the first electronic component 102 can include a display 106 (e.g., a liquid crystal display), a face plate 107, input buttons 108, and/or other types of electronic subcomponents. The first housing 101 can include a structure suitably sized and shaped to carry these electronic and/or mechanical subcomponents.

The second electronic component 104 can include a second housing 103 that carries input/output components and is constructed generally similarly to the first housing 101. The second electronic component 104 can include input components, such as a camera button 118 and a voice recorder button 122, to accept inputs from a user. The second electronic component 104 can also include a communication port 112 for connecting to an external device (e.g., a personal computer, not shown). The communication port 112 can be, for example, a Universal Serial Bus port or other suitable communication port. The second electronic component 104 can further include various output components, such as a headphone port 114 and a speaker 116, to provide feedback to the user. The electronic device 100 can further include other computing components, such as those generally found in PDA devices, cellular phones, laptop computers, tablet PCs, smart phones, hand-help email devices, or other mobile communication/computing devices. In one embodiment, the electronic device 100 can be an e-mail device or used for transmitting/receiving e-mail.

In one mode of operation, the user can operate the electronic device 100 in the closed position using the input buttons 108 on the first electronic component 102 and/or the buttons 118, and 122 on the second electronic component 104. The user can obtain feedback from the electronic device 100 via the display 106, the headphone port 114, the speaker 116, or a combination of these subcomponents. In other modes of operation, the electronic device can be operated in any of several open positions, as is described further below.

Figure 2B:
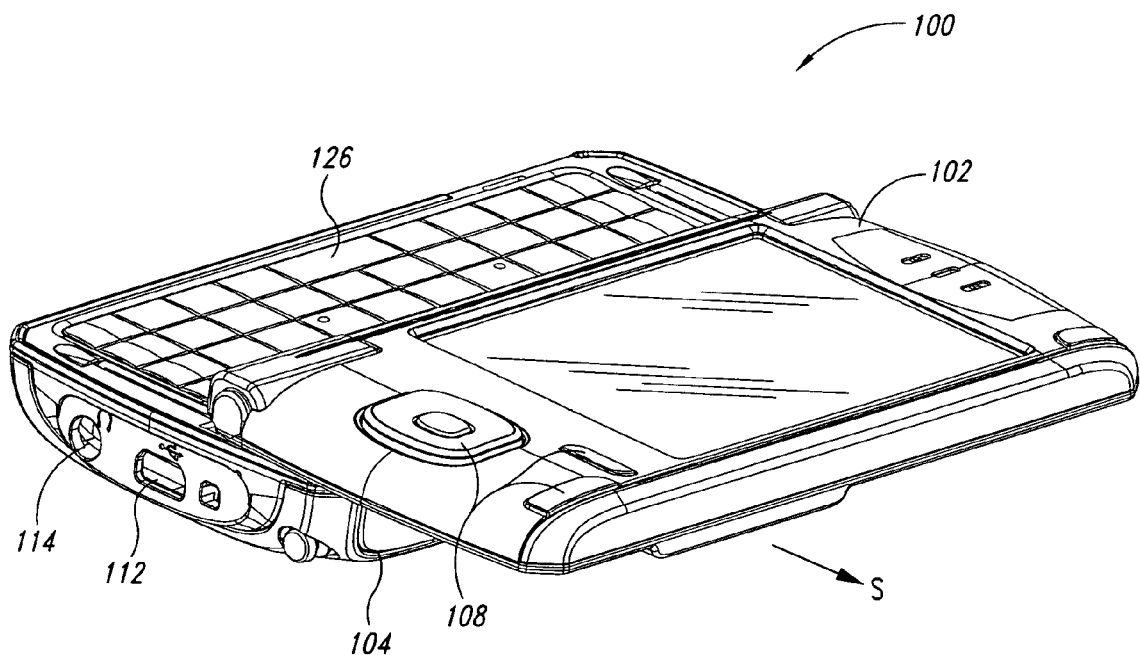

FIG. 2B is a perspective view of the electronic device 100 of FIG. 2A in a slide-out configuration. The first electronic component 102 can slide in a sliding direction S relative to the second electronic component 104 and retract in the reverse direction. In the slide-out position, the first electronic component 102 can be offset from the second electronic component 104 to expose an input device 126 of the second electronic component 104. The first electronic component 102 can also retract to the closed position shown in FIG. 2A to hide the input device 126. In the illustrated embodiment, the input device 126 includes a keyboard (e.g., a QWERTY keyboard, a QWERTZ keyboard, an AZERTY keyboard, and a DVORAK keyboard). In other embodiments, the input device 126 can include a touch pad, a handwriting tablet, or other suitable input components. The keyboard-type input device 126 is particularly useful because it is easy and efficient to type message into the electronic device 100. The second electronic component 104 can also include additional electronic and/or mechanical subcomponents (e.g., push buttons and/or a magnetic card reader) positioned proximate to the input device 126.

Figure 2C:
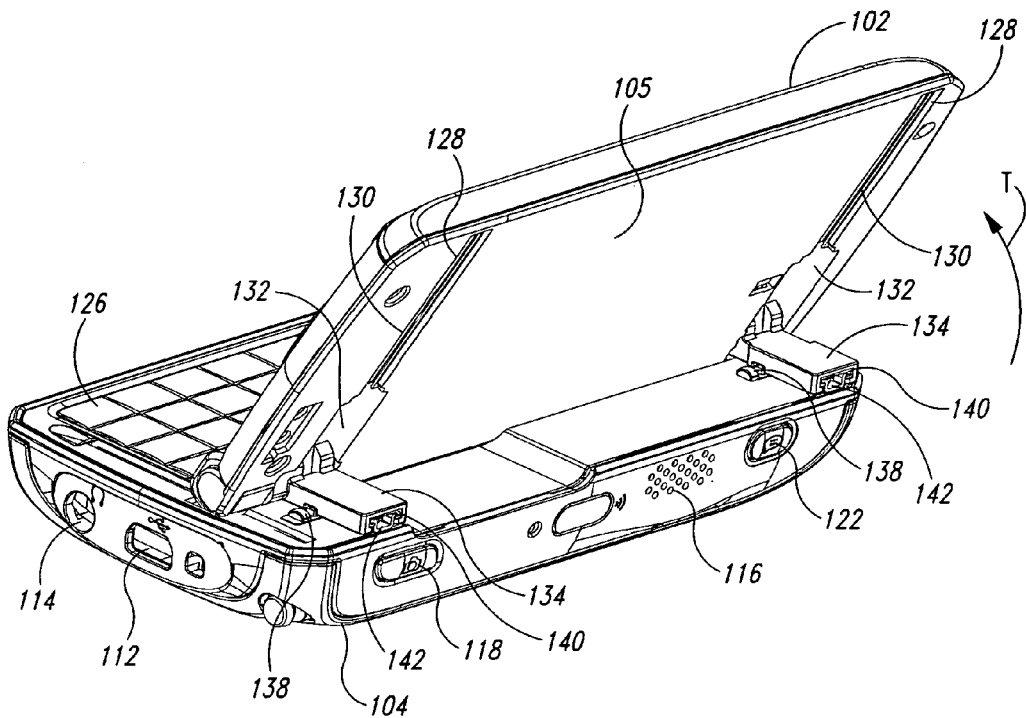

FIG. 2C is a perspective view of the electronic device 100 of FIG. 2A in a tilted configuration. The first electronic component 102 can pivot in a tilting direction T relative to the second electronic component 104 when the first electronic component 102 is offset from the second electronic component 104. Accordingly, the major plane of the first electronic component 102 can form a non-zero angle relative to the major plane of the second electronic component 104. For example, the first and second electronic components are pivotable relative to each other to form an angle that is greater than 0° and less than 180°.

FIG. 2C also illustrates features of a representative mechanism that facilitates the foregoing sliding and tilting action. For example, the first electronic component 102 can include first channels 128 and first sliding members 130 received in the first channels 128 on or near a surface 105 of the first electronic component 102. The first sliding members 130 can extend generally the entire length of the first channels 128 and can be fixedly fastened to the first electronic component 102 in the first channels 128 using bolts, rivets, clips, pins, adhesives, or other fasteners. In the illustrated embodiment, the first sliding members 130 include rails having a generally U-shaped cross section, as described in more detail below with reference to FIGS. 5A-5B. In other embodiments, the first sliding members 130 can include bars, shafts, rods, or other types of sliding structures.

The electronic device 100 can include hinges 134 and second channels 132 on or near the surface 105 of the first electronic component 102. The second channels 132 can be positioned adjacent to the first channels 128 and sized and shaped to receive a corresponding one of the hinges 134. The hinges 134 can slidably and pivotably connect the first and second electronic components 102, 104 so that the first and second electronic components 102, 104 are both slidable and pivotable relative to each other. Embodiments of the hinges 134 are described further below with reference to FIG. 4.

The electronic device 100 can further include second sliding members 140 at least partially housed in each of the hinges 134. The second sliding members 140 can be shaped generally similarly to the first sliding members 130. In some embodiments, the second sliding members 140 can be longer than the first sliding members 130. In other embodiments, the second sliding members 140 can be shorter than or equal in length to the first sliding members 130.

The electronic device 100 can further include elastic locks 138 carried by the second electronic component 104. The elastic locks 138 can be positioned proximate to individual hinges 134 for releasably engaging the hinges 134. Once the elastic locks 138 engage the hinges 134, the elastic locks 138 can prevent the first and second electronic components from sliding relative to each other in the sliding direction S, as described in more detail below with reference to FIG. 2D.

Figure 2D:
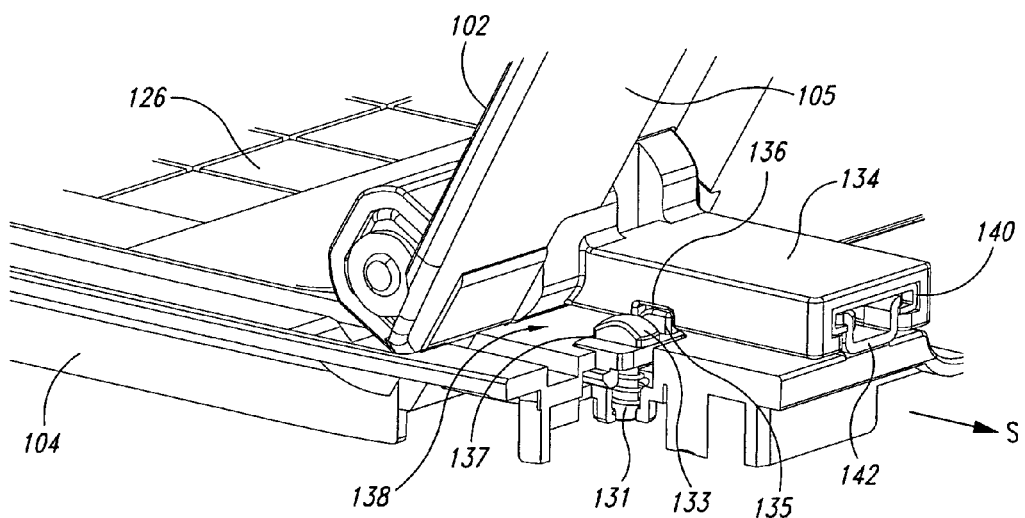
FIG. 2D is an enlarged and partially cut-away perspective view of a portion of the electronic device of FIG. 2C.

FIG. 2D is an enlarged and partially cut-away perspective view of a portion of the electronic device 100 shown in FIG. 2C. As illustrated in FIG. 2D, the second electronic component 104 can include a guide member 142 for guiding the first and second sliding members 130, 140 (FIG. 2C). The guide member 142 can be fixedly attached to the second electronic component 104, and can sequentially engage the first and second sliding members 130, 140. For example, when the first electronic component 102 and the second electronic component 104 are in the illustrated position relative to each other, the second sliding member 140 generally houses the guide member 142, and the first electronic component 102 is able to tilt relative to the second electronic component 104. When the first and second electronic components 102, 104 have other positions relative to each other (e.g., when they face directly toward each other), the guide member 142 can move out of the second sliding member 140 and engage the first sliding member 130 (FIG. 2C) to facilitate the sliding motion of the first electronic component 102.

The relative sliding motion of the first electronic component 102 can be selectively stopped by the elastic locks 138, one of which is shown in FIG. 2D. The elastic lock 138 can include a plate 137, a first protrusion 133, and a second protrusion 135, both carried by the plate 137. The plate 137 can allow the first and second protrusions 133, 135 to move together. The elastic lock 138 can further include a coil spring 131 disposed in a recess of the second electronic component 104. The coil spring 131 can force the plate 137 away from the second electronic component 104. The second protrusion 135 can be sized and shaped to fit in a notch 136 of the hinges 134.

When the first and second electronic components 102, 104 are generally juxtaposed face-to-face toward each other (as shown in FIGS. 2A-2B), the generally flat surface 105 of the first electronic component 102 depresses the first protrusion 133 downwardly to disengage the second protrusion 135 downwardly out of the notch 136. The hinge 134 and/or the guide member 142 are then free to slide relative to each other in the sliding direction S. When the notch 136 of the hinge 134 is again aligned with the second protrusion 135, and the first electronic component 102 is tilted upwardly, the depressing force on the elastic lock 138 is removed. The coil spring 131 can then force the second protrusion 135 into the notch 136 to prevent the hinge 134 and the guide member 142 from sliding any farther relative to each other.

The overall operation of the electronic device 100 is now described with reference to FIGS. 2A-2D. To open the electronic device 100, the user can slide the first electronic component 102 relative to the second electronic component 104, as shown by arrow S in FIG. 2B. The user can then tilt the first electronic component 102 as indicated by arrow T in FIG. 2C. The hinges 134 allow the first electronic component 102 to pivot relative to the second electronic component 104 because the first sliding members 130 are free from the second sliding members 140. A user can thus adjust a viewing angle of the display 106 (FIG. 2A) relative to the input device 126 by pivoting at least one of the first and second electronic components relative to the other. Because several of the components are visible in FIGS. 2C and 2D but not FIG. 2B, further aspects of both the sliding and tilting operations are now described with reference to FIGS. 2C and 2D. These aspects are discussed in the context of folding and closing the electronic device 100, which is shown in the unfolded and opened position in FIGS. 2C and 2D. Accordingly, the following steps are simply reversed to open and unfold the electronic device 100.

The sliding operation is described below in the context of sliding the first component 102 relative to the second component 104. It will be understood that the same general characteristics of the motion apply as well when moving the second component 104 relative to the first component 102. Before the sliding operation, the user folds the first electronic component 102 downwardly so that the first and second sliding members 130, 140 are axially aligned and form a discontinuous path. The hinge 134 is received in the second channel 132 of the first component 102. At this point, the guide member 142 (FIG. 2D) is engaged with the second sliding member 140. At the beginning of the sliding operation, as first electronic component 102 slides relative to the second electronic component 104, in the direction opposite that shown by arrow S, the second sliding member 140 slides relative to the guide member 142. As the sliding continues, the guide member 142 disengages from the second sliding members 140 and engages the first sliding member 130. The guide member 142 remains engaged with the first sliding member 130 throughout the closing process. When the guide member 142 is engaged with the first sliding member 130, the first and second electronic components 102, 104 are at least restricted (e.g., prevented) from pivoting relative to each other.

One expected advantage of several embodiments of the electronic device 100 shown in FIGS. 2A-D is that the user can move the display 106 to any of a wide variety of viewing angles. Accordingly, the user can more easily see both the display 106 and the input device 126 simultaneously, without having to look up to read the display 106, and then look down to see the input device 126, as in conventional devices. As a result, the user can operate the electronic device 100 while in a more comfortable posture.

Another expected advantage of several embodiments of the electronic device 100 shown in FIGS. 2A-D is that the user can operate the device in different manners depending on the configuration the user places the device in. For example, when the user places the device in the closed configuration as shown in FIG. 2A, the user can operate the device using buttons 108 (FIG. 2A) and obtain feedback from the display 106 (FIG. 2A). When the user places the device in the slide-out configuration as shown in FIG. 2B, the user can operate the device using the keyboard 126 (FIGS. 2B-2D). When the user places the device in the tilted configuration as shown in FIG. 2C-2D, the user can operate the device using the keyboard 126 (FIGS. 2B-2D) and can move the display 106 (FIG. 2A) to obtain a desired viewing angle.

Figure 3:
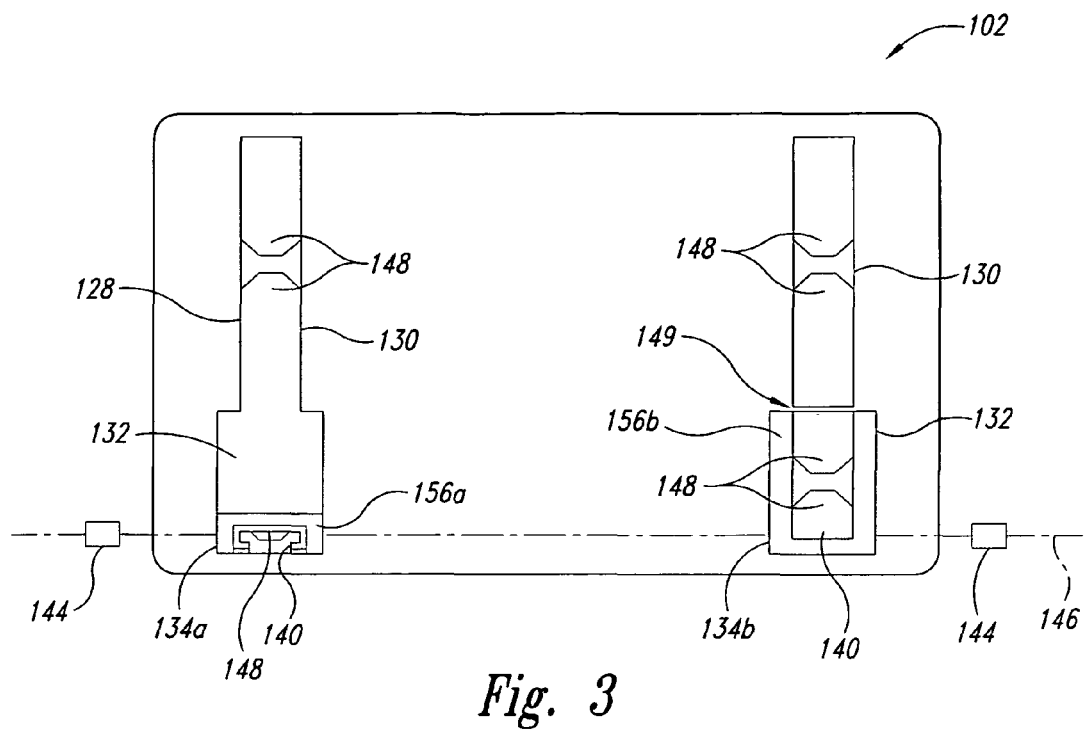
FIG. 3 is a partially exploded bottom view of a first electronic component of the electronic device of FIGS. 2A-2C configured in accordance with an embodiment of the invention.

FIGS. 3-7 illustrate further details of various components of the electronic device 100 shown in FIGS. 2A-2D. For example, FIG. 3 is a partially exploded bottom view of the first electronic component 102 of the electronic device 100, with the second electronic component 104 detached for clarity. The hinges 134 (illustrated individually as a first hinge 134a and a second hinge 134b) can be disposed in and rotatably attached to the first housing 101 with first hinge portions 144. Individual hinges 134 can also include housing portions 156a-b that can rotate relative to the first electronic component 102 about a rotation axis 146. In FIG. 3, the housing portion 156a of the first hinge 134a is rotated so as to extend in a direction generally perpendicular to the first electronic component 102, and the housing portion 156b of the second hinge 134b is shown rotated into the plane of the first electronic component 102 so as to be received in the second channel 132. In actual operation, the housing portions 156a-b rotate together. The first and second sliding members 130, 140 can further include clip devices 148 configured to receive and releasably engage the guide members 142 (FIG. 2D), as described in more detail below with reference to FIGS. 5-7.

When the housings 156a-b are rotated into the plane of FIG. 3 and are received in the corresponding second channels 132, each first sliding member 130 is generally axially aligned with its corresponding second sliding member 140. However, each first sliding member 130 is separated from its corresponding second sliding member 140 by a discontinuity 149. The discontinuity 149 can include a slit or other type of disconnection. The discontinuity 149 allows the second sliding members 140 to be rotated relative to the first sliding members 130 when tilting the first electronic component 102 relative to the second electronic component 104 (FIG. 2C). When the first and second sliding members 130, 140 are co-axial, they form a discontinuous path that allows the guide members 142 (shown in FIG. 6) to slide along the path.

Figure 4:
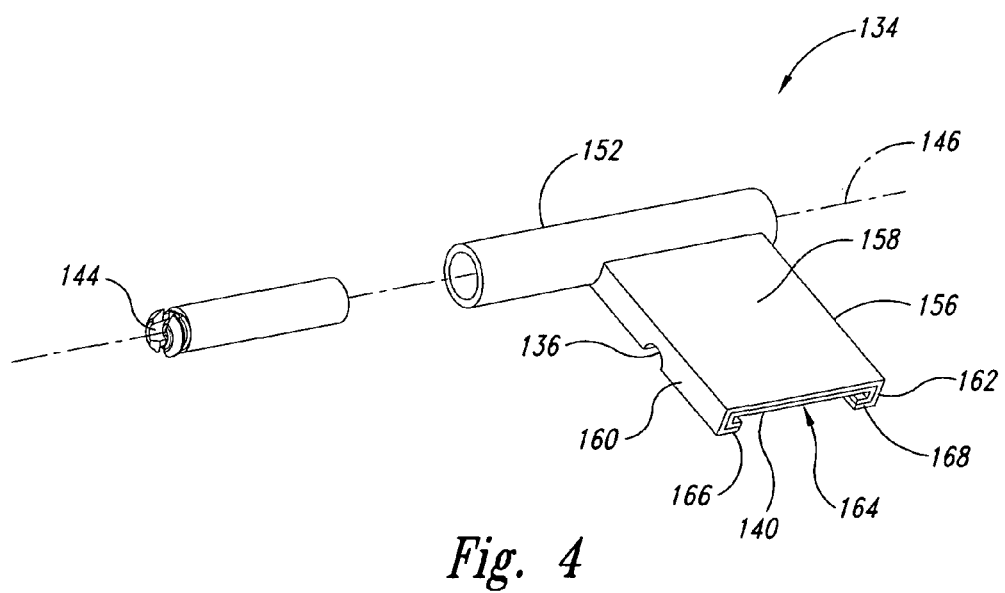
FIG. 4 is a perspective view of a hinge of the electronic device of FIGS. 2A-2C configured in accordance with an embodiment of the invention.

FIG. 4 is a perspective view of one of the hinges 134 of the electronic device 100. The hinge 134 can include the first hinge portion 144, a second hinge portion 152 configured to receive the first hinge portion 144, and the housing portion 156 extending from the second hinge portion 152. The first hinge portion 144 can include different types of pivoting components. For example, the first hinge portion 144 can include a free-stop hinge (Model No. F001-50F05-100) manufactured by Simula Technology Inc. of Taiwan, or another type of pivoting component. The second hinge portion 152 can be shaped and sized to house the first hinge portion 144.

The housing portion 156 can be fixedly attached to the second hinge portion 152 so as to extend in a direction away from the rotation axis 146. The housing portion 156 can be shaped and sized to receive the second sliding member 140. The housing portion 156 can have a generally rectangular shape with a first wall 158, second walls 160, 162 attached to the first wall 158, and third walls 166, 168 attached to each of the second walls 160, 162. The third walls 166, 168 form a pair of inward lips facing each other across a slot 164. In other embodiments, the housing portion 156 can have other shapes including, for example, a U shape, or an L shape.

FIGS. 5A-5B are bottom views of the first and second sliding members 130, 140 in a first position and a second position, respectively. In FIGS. 5A-5B, the first and second sliding members 130, 140 are shown engaged with the guide member 142 (shown in phantom lines). For purposes of illustration, other associated components are not shown in FIGS. 5A-5B. As shown in FIGS. 5A-5B, the first and second sliding members 130, 140 can be generally aligned with each other along a sliding axis 151, forming a sliding path that includes the discontinuity 149. When the first and second sliding members 130, 140 are in the first position as shown in FIG. 5A, the first sliding member 130 houses the guide member 142. At least one of the first sliding member 130 and the guide member 142 can slide relative to the other along the sliding path. As the first sliding member 130 and the guide member 142 slide relative to each other along the sliding axis 151, the guide member 142 can cross over the discontinuity 149 to engage the second sliding member 140. At least one of the second sliding member 140 and the guide member 142 can then slide relative to the other along the sliding axis 151 so that the second sliding member 140 generally houses the guide member 142. When the first and second sliding members 130, 140 are in the second position as shown in FIG. 5B, the guide member 142 is disengaged from the first sliding member 130. The first sliding member 130 can then pivot relative to the guide member 142, allowing the device 100 (FIG. 2C) to achieve a position shown in FIG. 2C.

FIG. 5C is an end view of the first sliding member 130 shown in an upright position. The second sliding member 140 has a generally similar configuration. The first sliding member 130 can include a first wall 170, second walls 172, 174 attached to the first wall 170, and third walls 176, 178 attached to each of the second walls 172, 174. A slot 175 separates opposing pairs of the third walls 176, 178, which extend toward each other. An optional clip device 148 is positioned in the slot 175, and can extend into a space 184 formed by the first wall 170, second walls 172, 174, and the third walls 176, 178. Referring now to FIG. 5A, opposing pairs of clip devices 148 can be positioned in both the first sliding member 130 and the second sliding member 140, and can be separated by gaps 180. In certain embodiments, the clip device 148 can be omitted, or the first and second sliding members 130, 140 can incorporate other types of elastic locks. The operation of the clip devices 148 is further described below with reference to FIGS. 6-7.

Figure 6:
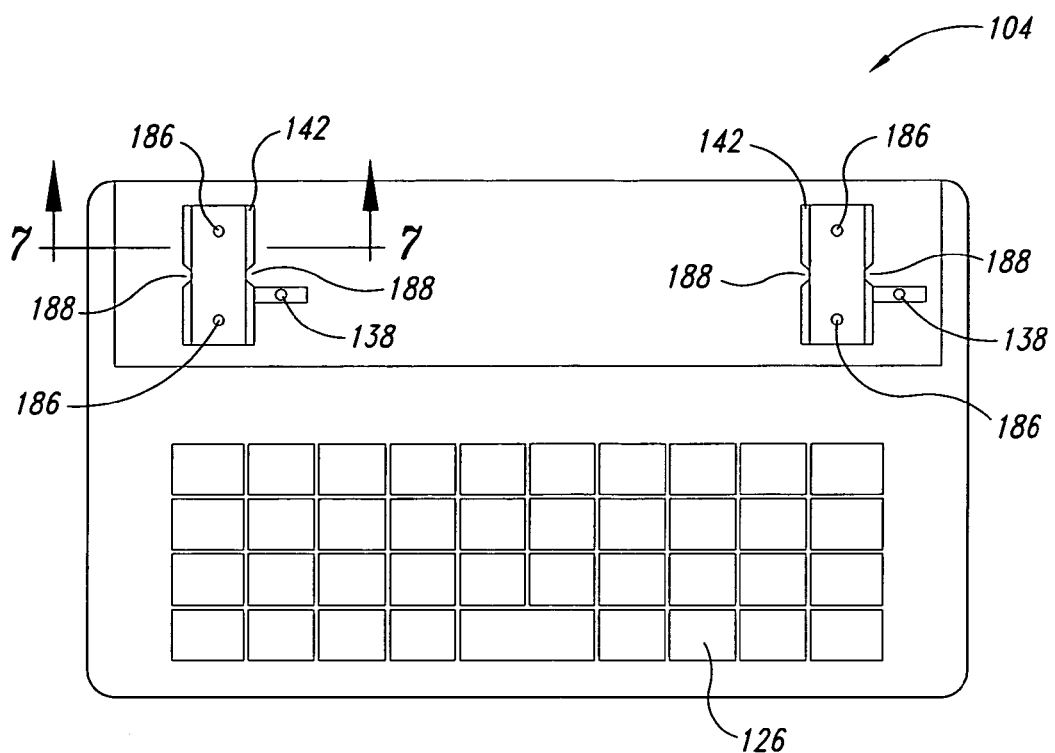
FIG. 6 is a top view of a second electronic component of the electronic device of FIGS. 2A-2C that includes a guide member configured in accordance with an embodiment of the invention.

FIG. 6 is a top view of the second electronic component 104 of the electronic device 100, with the first electronic component 102 detached for clarity. The guide members 142 can be fixedly attached to the second electronic component 104 with fasteners 186. The fasteners 186 can include bolts, rivets, clips, pins, or other types of fasteners. The guide members 142 can optionally include notches 188 configured to engage the clip devices 148 as described in more detail below with reference to FIG. 7.

Figure 7:
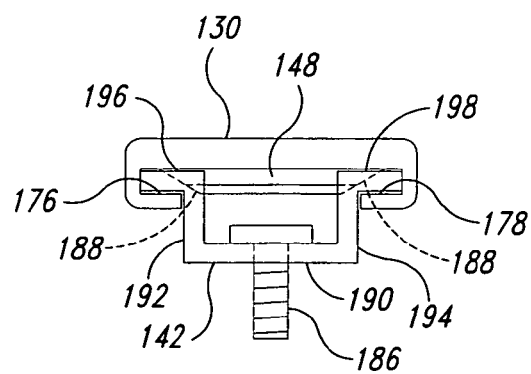
FIG. 7 is a cross-sectional view of the guide member of FIG. 6 assembled with the sliding members of FIGS. 5A-5B in accordance with an embodiment of the invention.

FIG. 7 is a cross-sectional view of the guide member 142 engaged with the clip device 148 of the first sliding member 130 for relative sliding motion. It will be understood that the guide member 142 can slide along the second sliding member 140 in a similar manner. The guide member 142 can have a generally rectangular cross section formed by a first wall 190, second walls 192, 194, and third walls 196, 198 attached to each of the second walls 192, 194. The third walls 196, 198 extend opposite of each other. After assembly, the third walls 196, 198 of the guide member 142 can rest on the third walls 176, 178 of the first sliding member 130 and can slide relative to the first sliding member 130.

Referring now to FIGS. 6 and 7 together, the clip device 148 can releasably engage the guide member 142 to resist relative sliding motion between the guide member 142 and the first sliding member 130. In particular, when the notches 188 of the guide member 142 are generally aligned with the clip device 148 of the first sliding member 130, the clip device 148 can extend into the notches 188 to releasably engage the guide members 142. A user can disengage the notches 188 from the clip device 148 by forcing the first and second electronic components 102, 104 (FIG. 2B) to slide relative to each other.

C. Additional Embodiments of Electronic Devices

Figure 8:
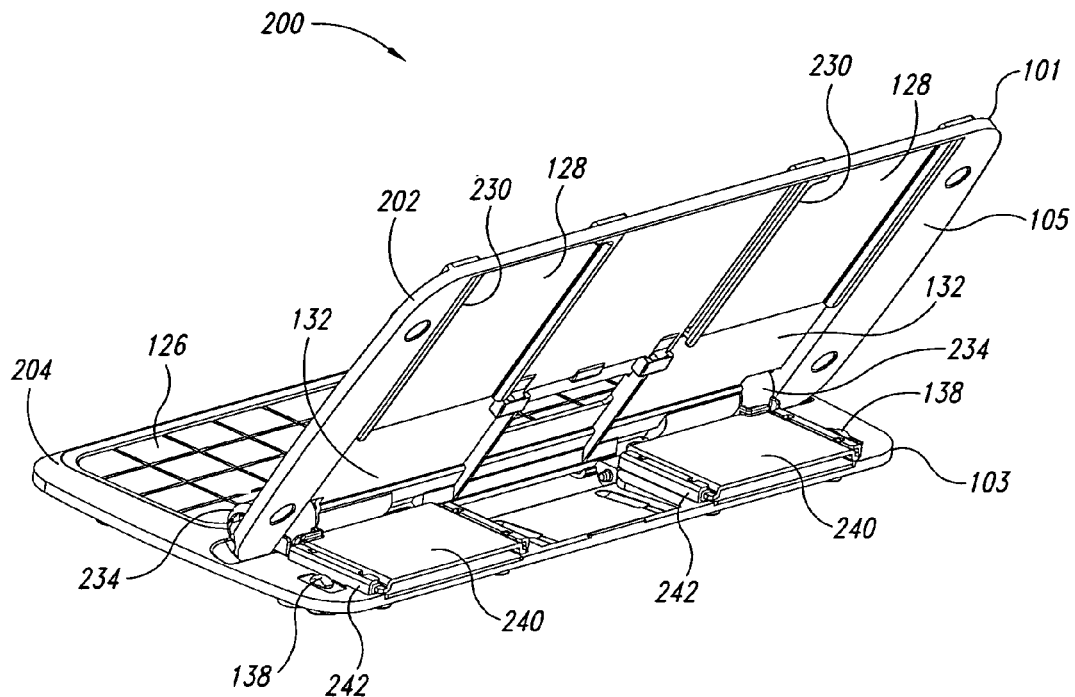
FIG. 8 is a perspective view of an electronic device having guide members and hinges configured in accordance with another embodiment of the invention.

FIGS. 8-12 illustrate additional embodiments of the electronic device 100 shown in FIGS. 2A-2D. FIG. 8 is a perspective view of an electronic device 200 shown in a tilted position and configured in accordance with another embodiment of the invention. In this embodiment, several components of the electronic device 200 shown in FIG. 8 are at least generally similar to the corresponding components of the electronic device 100 described above. Accordingly, selected differences in the operation and structure of the electronic device 200 shown in FIG. 8 are described below. Like reference symbols generally refer to like features and components in FIGS. 2-7.

The electronic device 200 can include a first electronic component 202, a second electronic component 204, and hinges 234 movably connecting the first and second electronic components 202, 204. Portions of the second electronic component 204 have been removed for purposes of illustration. The first electronic component 202 can include first sliding members 230 disposed on the first housing 101. The hinges 234 can include second sliding members 240. The second electronic component 204 can include guide members 242 that sequentially engage the first and second sliding members 230, 240. In the illustrated embodiment, the housing portion of the hinges 234 is eliminated and the hinges 234 can integrally incorporate the second sliding members 240 as described in more detail below with reference to FIG. 9. The hinges 234 can operate in a generally similar way as the hinges 134 shown in FIG. 4. The electronic device 200 can further include urging devices as described in more detail below with reference to FIGS. 11A-11B and FIGS. 12A-12D.

Figure 9:
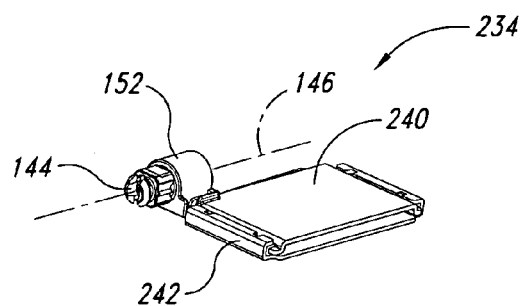
FIG. 9 is a perspective view of the hinge shown in FIG. 8 and configured in accordance with an embodiment of the invention.

FIG. 9 is a perspective view of one of the hinges 234 shown engaged with the guide member 242. In particular, the hinge 234 carries the second sliding member 240, which is in turn engaged with the corresponding guide member 242. The second sliding member 240 can extend from the second hinge portion 152 in an outward direction from the axis 146. The second sliding member 240 can be fixedly attached to the second hinge portion 152 via a weldment, molding, mechanical fastening, or other suitable device. The second sliding member 240 can be molded into the second hinge portion 152 offset from the axis 146, or generally coplanar with the axis 146.

Figure 10:
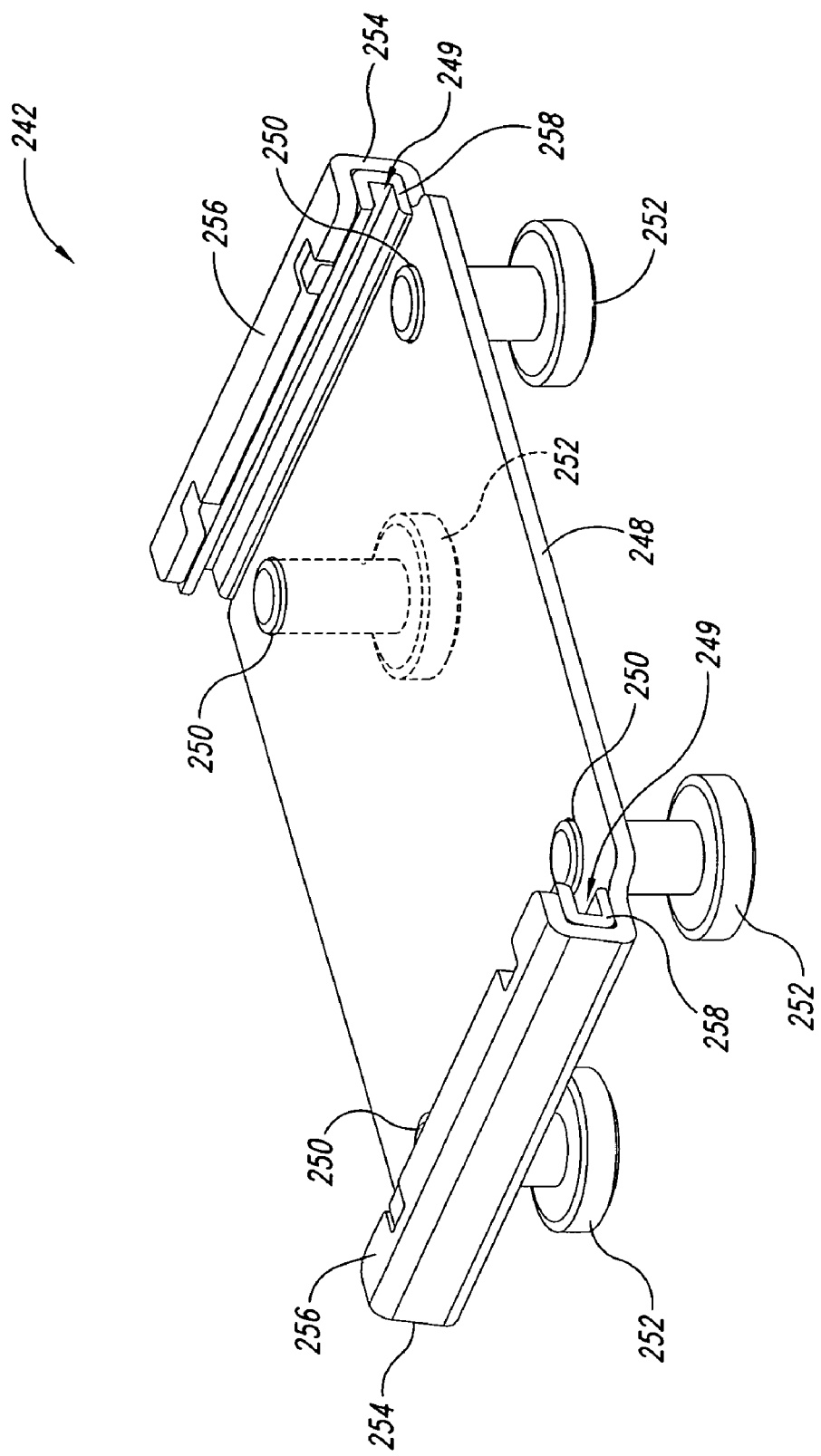
FIG. 10 is a perspective view of the guide member shown in FIG. 8, and configured in accordance with an embodiment of the invention.

FIG. 10 is a detailed perspective view of the guide member 242 of FIG. 9. The guide member 242 can include a first wall 248 having a plurality of apertures 250 positioned to receive fasteners 252 for fastening the guide member 242 to the second electronic component 204 (FIG. 8). The guide member 242 can also include second walls 254 extending from the first wall 248, and opposing third walls 256 extending toward each other. The third walls 256 can be generally parallel to the first wall 248. Accordingly, the first wall 248, the second walls 254, and the third walls 256 together can form two sliding channels 249 facing each other across the first wall 248. In the illustrated embodiment, the sliding channels 249 have a generally U-shaped cross section. In other embodiments, the sliding channels 249 can include other cross-section shapes including, for example, V shape, L shape, or other desired shapes. The guide member 242 can further include channel inserts 258 generally completely disposed in the sliding channels 249 to facilitate the sliding process. The channel inserts 258 can be constructed from a resilient material, e.g., a polymeric material, to cushion the relative sliding motion between the guide member 242 and the first and second sliding members 230, 240 (FIG. 8).

Figure 11A:
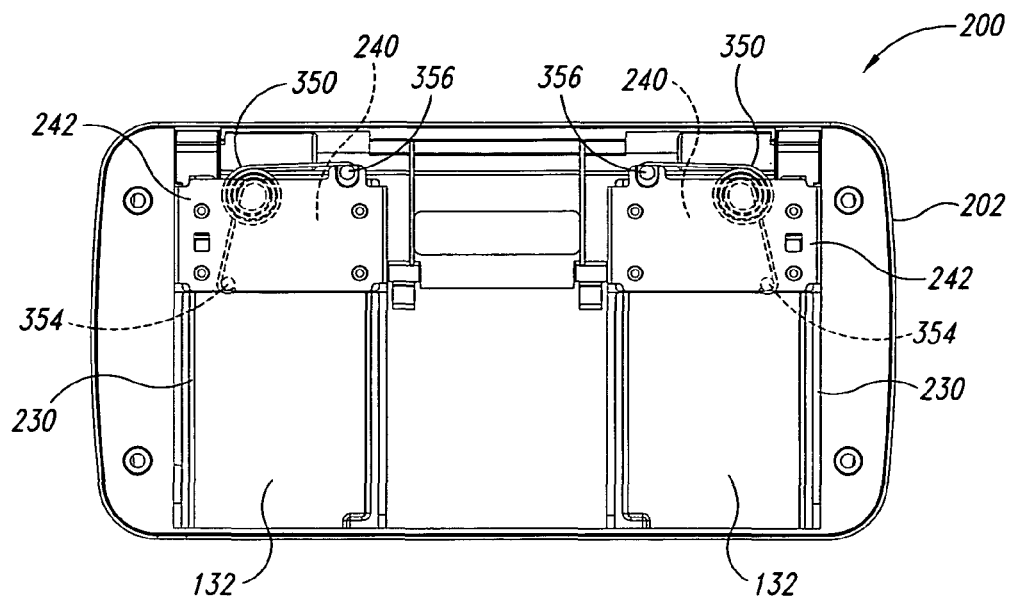
FIGS. 11A-11B are bottom views of an electronic device having slide assisting springs and configured in accordance with another embodiment of the invention.
Figure 11B:
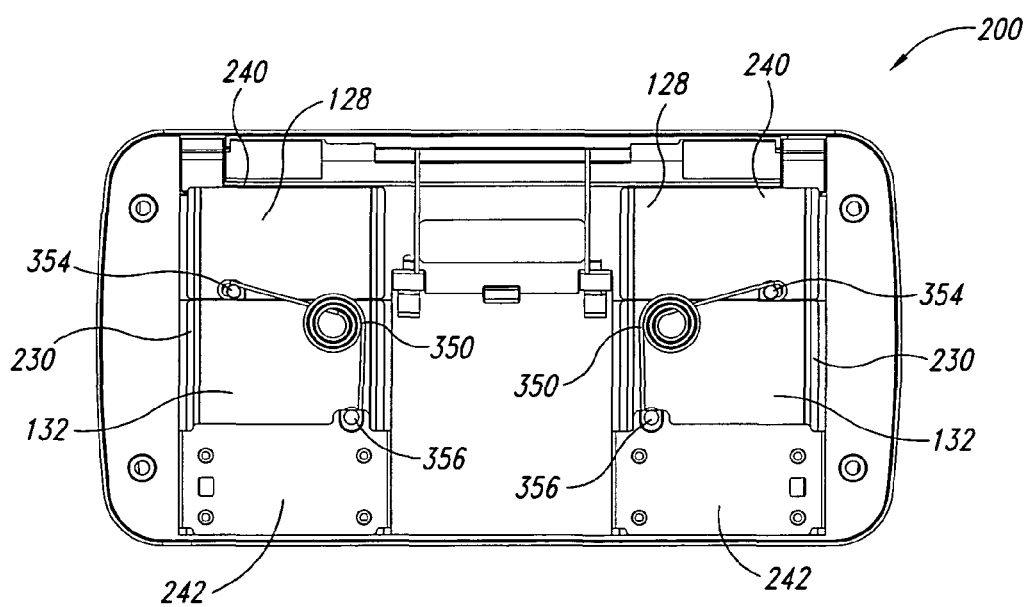

FIGS. 11A-11B are bottom views of an embodiment of the electronic device 200 that incorporates an urging device to assist the user when sliding one component of the device 200 relative to another. For purposes of illustration, only the first component 202 is shown in FIGS. 11A-11B. Accordingly, in the illustrated example, the guide members 242 (which form a portion of the second electronic component 204, shown in FIG. 8) are shown, but the rest of the second component is not. FIG. 11A illustrates the guide members 242 positioned relative to the first and second sliding members 230, 240 when the first electronic component 202 and the second electronic component 204 (FIG. 8) slidably offset from each other, e.g., generally similar to the open configuration shown in FIG. 2B. FIG. 11B illustrates the guide members 242 positioned relative to the first and second sliding members 230, 240 when the first electronic component 202 and the second electronic component 204 (FIG. 8) are in a closed position, e.g., generally similar to the closed configuration shown in FIG. 2A.

The electronic device 200 can include an elastic device that assists in the process of sliding the second electronic component 204 (FIG. 8) relative to the first electronic component 202. In the illustrated embodiment, the elastic device includes coil springs 350 attached to both the second sliding members 240 and the guide members 242 to facilitate the sliding process. In other embodiments, the elastic device can include other elastic components for assisting the sliding process.

In the illustrated embodiment, the coil springs 350 include off-centered springs having first ends 354 fixedly attached to the second sliding members 240 and second ends 356 attached to the guide members 242. The off-centered coil springs 350 can hold the guide members 242 relative to the sliding members 230, 240, e.g., in the position shown in FIG. 11A. As the user slides the guide members 242 toward the position shown in FIG. 11B, the guide members 242 compress the coil springs 350. When the second ends 356 of the coil springs 350 pass the first ends 354, the coil springs 350 extend in the opposite direction to drive the guide members 242 (and the second electronic component 204) toward the open position. Accordingly, the user only needs to initiate the sliding process and the coil springs 350 can complete the process.

Figure 12A:
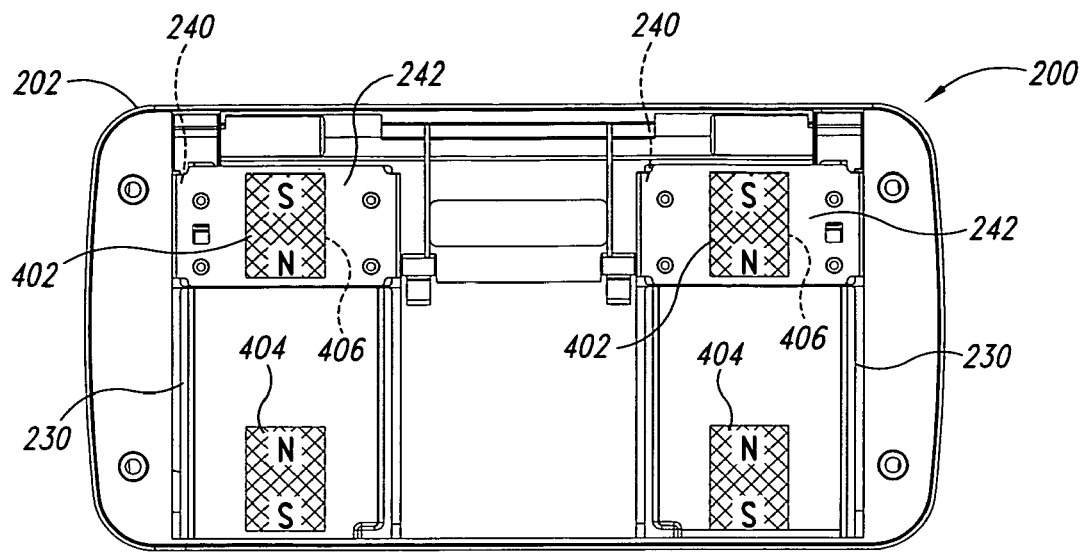
FIGS. 12A-12B are bottom views of an electronic device having slide assisting magnets and configured in accordance with another embodiment of the invention.
Figure 12B:
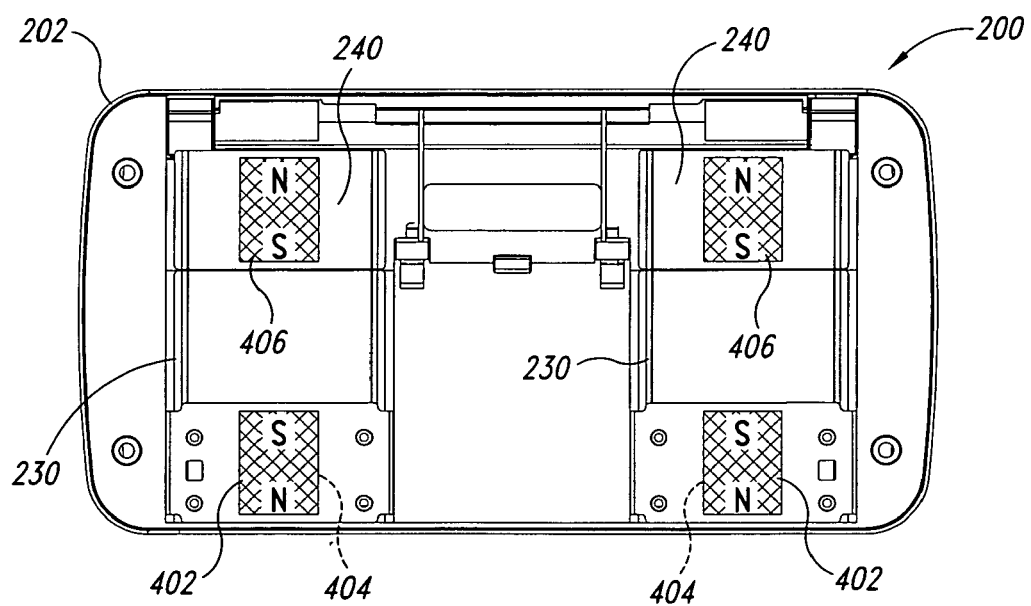

FIGS. 12A-12B are bottom views of an embodiment of the electronic device 200 that incorporates another urging device to assist the user when sliding one component of the device 200 relative to another. In the illustrated example, the guide members 242 (which form a portion of the second electronic component) are shown, but other subcomponents of the second electronic component have been removed for clarity. FIG. 12A illustrates the first and second sliding members 230, 240 and the guide members 242 when the first electronic component 202 and the second electronic component 204 (FIG. 8) are in an open position. FIG. 12B illustrates the first and second sliding members 230, 240 relative to the guide members 242 when the first electronic component 202 and the second electronic component 204 (FIG. 8) are in a closed position.

The electronic device 200 can include magnetic media that assist in the process of sliding the first electronic component 202 and the second electronic component 204 (FIG. 8) relative to each other. For example, the electronic device 200 can include first, second, and third magnets 402, 404, and 406 attached to the guide members 242, the first sliding members 230, and the second sliding members 240, respectively. The poles of the first magnets 402 can be oriented generally opposite the poles of the second and third magnets 404, 406, as indicated by letters "N" and "S" in FIGS. 12A-12B. The operation of the magnets 402, 404, and 406 is described below in more detail with reference to FIGS. 12C-12D.

FIGS. 12C-12D are schematic cross-sectional views of the electronic device of FIGS. 12A-12B as it moves from an open position (FIG. 12C) to a closed position (FIG. 12D). The following steps are simply reversed to open the electronic device 200. Before the closing process, the first magnet 402 attracts the third magnet 406 because opposing poles of each magnets 402, 406 are generally aligned with each other. For example, as shown in FIG. 12C, the south pole of the first magnet 402 is generally aligned with the north pole of the third magnet 406. The attractive force between the first and third magnets 402, 406 can maintain the first and second electronic components 202, 204 in the open position. As the user slides the first electronic component 202 relative to the second electronic component 204, the attractive force between the first and third magnets 402 and 406 weakens because the poles of these magnets move away from each other. When the south pole of the first magnet 402 passes over the south pole of the third magnet 406, the repulsive force between the first and third magnets 402, 406 urges the first magnet 402 to slide toward the second magnet 404. When the first magnet 402 approaches the second magnet 404, the opposite poles of the first magnet 402 and the second magnet 404 attract each other. The attractive force then urges the first electronic component 202 to slide relative to the second electronic component 204 into the closed position as shown in FIG. 12D.

One feature of several embodiments of the electronic device 200 shown in FIGS. 11A-12D is that the urging device can maintain the relative position of the first and second electronic components 202, 204 (FIG. 8) by applying a biasing force. For example, the off-centered coil springs 350 can urge the first and second electronic components 202, 204 (FIG. 8) to be in the open configuration as shown in FIG. 11A or in a closed configuration as shown in FIG. 11B. Another feature of several embodiments of the electronic device 200 shown in FIGS. 11A-12D is that the urging device can assist the sliding process. For example, the magnets 402, 404, 406 can attract each other during the sliding process so that the user only needs to initiate the sliding process (e.g., by sliding the first electronic component 202 a small amount relative to the second electronic component 204). The magnets 402, 404, 406 can then complete the sliding process.

From the foregoing, it will be appreciated that specific embodiments of the invention have been described herein for purposes of illustration, but that various modifications may be made without deviating from the invention. For example, the elastic locks 138 can be omitted in certain embodiments. The electronic devices can include only one sliding member, one guide member, and one hinge instead of two of each. The electronic devices can also include additional components attached to the first and/or second electronic components, such as a reserve battery compartment, a radio receiver, and a transmitter. Certain aspects of the invention described in the context of particular embodiments may be combined or eliminated in other embodiments. For example, the electronic device 100 can also incorporate any of the urging devices as shown in FIGS. 11A-12C. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. A mobile communication device, comprising:
   a first electronic component having a first sliding member;
   a second electronic component having a guide member; and
   a hinge coupling the first and second electronic components, the hinge carrying a second sliding member, wherein the first and second sliding members are positioned to engage the guide member, with at least one of the first and second electronic components slidable relative to the other when the first and second sliding members are axially aligned with each other, wherein the first and second sliding members form a discontinuous path when the first and second sliding members are axially aligned with each other, such that the guide member is slidable along the discontinuous path, and further wherein at least one of the first and second electronic components is pivotable relative to the other when the guide member is engaged with the second sliding member.

2. The mobile communication device of claim 1 wherein the first sliding member is elongated along a first axis and the second sliding member is elongated along a second axis that is coaxial with the first axis.

3. The mobile communication device of claim 1 wherein the first electronic component further includes a first channel carrying the first sliding member and a second channel receiving the hinge when the first and second sliding members are axially aligned with each other.

4. The mobile communication device of claim 1 wherein the first and second electronic components are pivotable relative to each other to form an angle that is greater than 0° and less than 180°.

5. The mobile communication device of claim 1 wherein the guide member is housed in the second sliding member when one of the first and second electronic components is pivotable relative to the other.

6. The mobile communication device of claim 1 wherein at least one of the first and second sliding members further includes a clip device positioned to releasably engage the guide member.

7. The mobile communication device of claim 1 wherein the hinge further includes a notch and the second electronic component further includes an elastic lock positioned to engage the notch when one of the first and second electronic components is pivotable relative to the other.

8. The mobile communication device of claim 1, further comprising an urging device operatively coupled between the guide member and the second sliding member to urge relative motion between the first and second electronic components.

9. The mobile communication device of claim 8 wherein the urging device includes an elastic device having a first end coupled to the second sliding member and a second end coupled to the guide member.

10. The mobile communication device of claim 8 wherein the urging device includes a first magnet coupled to the first sliding member, a second magnet coupled to the second sliding member, and a third magnet coupled to the guide member.

11. The mobile communication device of claim 1 wherein the first electronic component further includes an LCD display and the second electronic component further includes a keyboard.

12. An electronic device, comprising:
a first electronic component having a first sliding member;
a second electronic component having a guide member; and
a hinge coupling the first and second electronic components and carrying a second sliding member, wherein at least one of the guide member and a discontinuous path formed, at least in part, by the first and second sliding members is slidable relative to the other when the first and second electronic components are in a first configuration, wherein the first and second sliding members form the discontinuous path when the first and second sliding members are axially aligned with each other, such that the guide member is slidable along the discontinuous path, and wherein the guide member is at least restricted from sliding relative to the first and second sliding members when the first and second electronic components are in a second configuration.

13. The electronic device of claim 12 wherein the first and second electronic components are slidable relative to each other in the first configuration.

14. The electronic device of claim 12 wherein the first and second electronic components are pivotable relative to each other in the second configuration.

15. The electronic device of claim 12 wherein the discontinuous path includes a slit between the first and second sliding members, and wherein the guide member has a length greater than a length of the slit to slide across the slit along the discontinuous path.

16. The electronic device of claim 12 wherein the first and second sliding members further include at least one slot extending along the discontinuous path, and the slot is positioned to receive the guide member.

17. A mobile communication device comprising:
a first electronic component;
a second electronic component movably coupled to the first electronic component;
sliding means for sliding the first electronic component along a sliding path relative to the second electronic component, wherein the sliding path is a discontinuous path formed by multiple components;
restricting means for at least restricting the first electronic component from sliding relative to the second electronic component when the first electronic component is in a position relative to the second electronic component along the sliding path; and
pivoting means for pivoting the first electronic component relative to the second electronic component when the first electronic component is restricted from sliding relative to the second electronic component.

18. The mobile communication device of claim 17 wherein the first and second electronic components are positioned at an angle that is greater than 0° but less than 180° when the first electronic component is pivoted relative to the second electronic component.

19. The mobile communication device of claim 17 wherein the restricting means include an elastic lock.

20. The mobile communication device of claim 17, further comprising urging means for urging sliding motion of the first electronic component relative to the second electronic component.

21. The mobile communication device of claim 17 wherein the sliding means include a first sliding member and a second sliding member, each positioned to engage with a guide member when the first and second sliding members are axially aligned with each other.

22. The mobile communication device of claim 17 wherein the pivoting means include a hinge.

23. A handheld e-mail device, comprising:
a first electronic component having a first front surface, a rear surface opposite to the front surface, a display disposed on the front surface, and a first sliding member disposed on the rear surface;
a second electronic component having a second front surface, a keyboard and a guide member, wherein the keyboard and the guide member are disposed on the second front surface; and
a hinge coupled between the rear surface of the first electronic component and the second front surface of the second electronic component and carrying a second sliding member, wherein the first and second sliding members are positioned to engage the guide member with at least one of the first and second electronic components slidable relative to the other when the first and second sliding members are axially aligned with each other, wherein the first and second sliding members form a discontinuous path when the first and second sliding members are axially aligned with each other, such that the guide member is slidable along the discontinuous path, and further wherein at least one of the first and second electronic components is pivotable relative to the other when the guide member is engaged with the second sliding member.

24. The handheld mobile communication device of claim 23 wherein the first sliding member is elongated along a first axis and the second sliding member is elongated along a second axis that is coaxial with the first axis.

25. The handheld mobile communication device of claim 23 wherein the keyboard is one of QWERTY, QWERTZ, AZERTY, and DVORAK keyboard.

26. The handheld mobile communication device of claim 23 wherein the first electronic component further includes a first channel carrying the first sliding member and a second channel receiving the hinge when the first and second sliding members are axially aligned with each other.

27. The handheld mobile communication device of claim 23 wherein the hinge further includes a notch and the second electronic component further includes an elastic lock positioned to engage the notch when one of the first and second electronic components is pivotable relative to the other.

28. A sliding and tilting module for an electronic device including a first electronic component and a second electronic component, comprising:

a first sliding member carried by the first electronic component;

a guide member carried by the second electronic component;

a hinge coupling the first and second electronic components and carrying a second sliding member, wherein the first and second sliding members are axially aligned with each other and positioned to engage the guide member when at least one of the first and second electronic components is slidable relative to the other, wherein the first and second sliding members form a discontinuous path when the first and second sliding members are axially aligned with each other, such that the guide member is slidable along the discontinuous path, and further wherein the guide member is engaged with the second sliding member when at least one of the first and second electronic components is pivotable relative to the other.

29. The sliding and tilting module of claim 28 wherein the guide member is housed in the second sliding member when one of the first and second electronic components is pivotable relative to the other.

* * * * *

UNITED STATES PATENT AND TRADEMARK OFFICE
CERTIFICATE OF CORRECTION

| | | |
|---|---|---|
| PATENT NO. | : 8,029,309 B2 | Page 1 of 1 |
| APPLICATION NO. | : 11/542704 | |
| DATED | : October 4, 2011 | |
| INVENTOR(S) | : Chung-Yuan Ou et al. | |

It is certified that error appears in the above-identified patent and that said Letters Patent is hereby corrected as shown below:

IN THE SPECIFICATIONS:

In column 8, line 4, delete "F001-50F05-100" and insert -- FP001-50F05-100 --, therefor.

Signed and Sealed this
Thirteenth Day of March, 2012

David J. Kappos
*Director of the United States Patent and Trademark Office*